Patented June 17, 1952

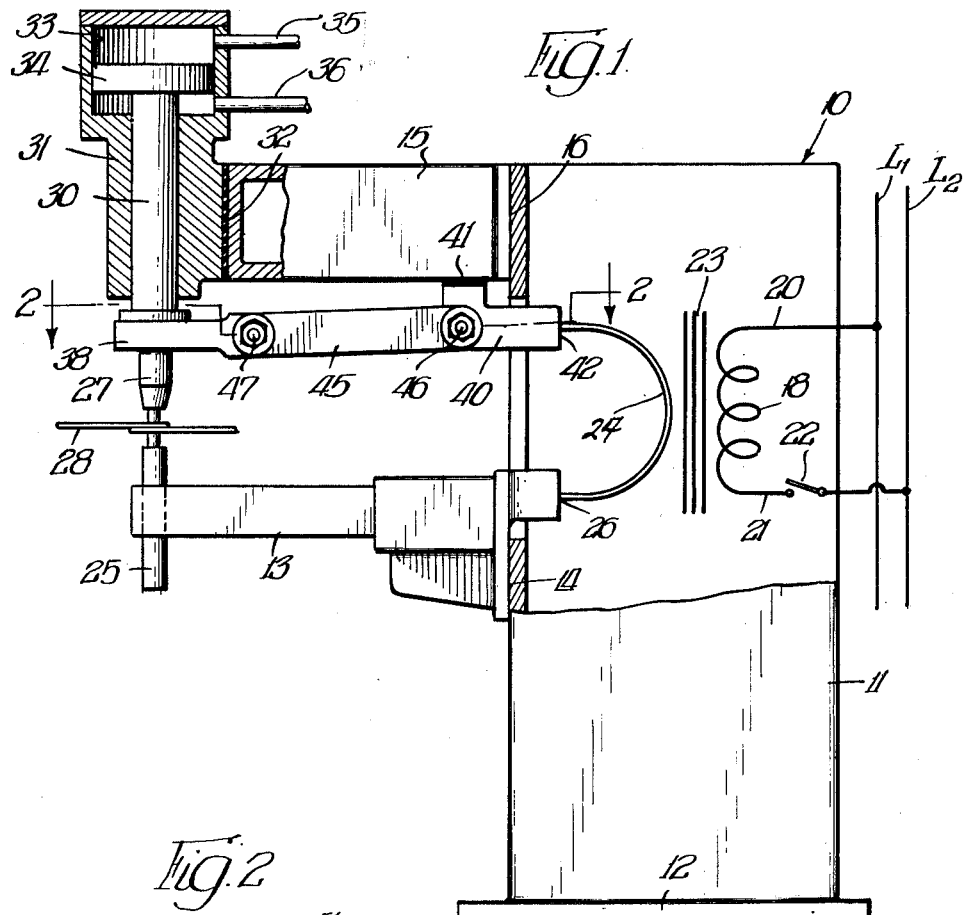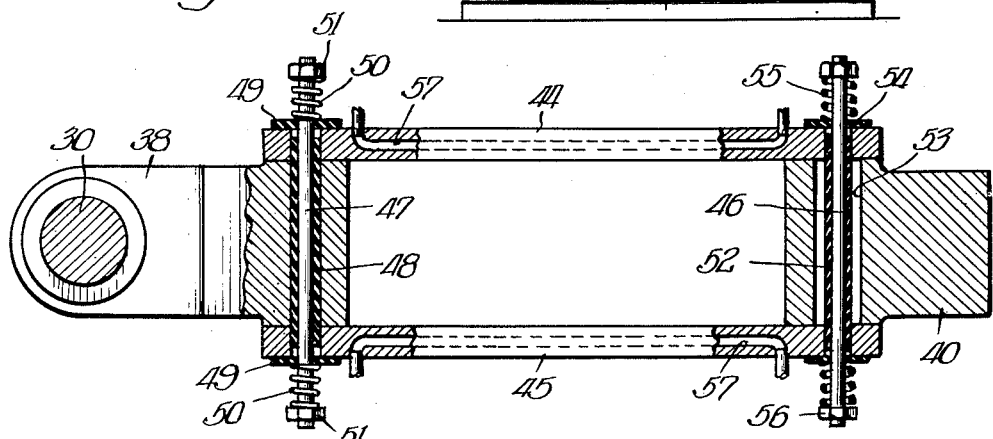

2,600,582

UNITED STATES PATENT OFFICE 2,600,582

SLIDING CONTACT SYSTEM FOR CONDUCTING WELDING CURRENTS

David Sciaky, Chicago, Ill., assignor to Welding Research, Inc., Chicago, Ill., a corporation of Illinois Application July 26, 1949, Serial No. 109,053

2 Claims. (Cl. 173—324)

The invention relates to conducting means for electric currents and has reference in particular to resistance welding machines and to improvements for conducting the high amperage current from the secondary circuit of the welding transformer to the movable electrode of such machines.

In certain electrical apparatus as, for example, resistance welding machines, a current of high amperage is induced in the secondary winding of the welding transformer and this current is conducted from at least one terminal of the winding to a movable electrode. In spot welding machines pressure is applied to the movable electrode to cause it to engage the workpiece between the same and a stationary electrode. In seam welding two wheels are used as electrodes, one being motor driven and rotating on a stationary bearing and the other being mounted on a movable bearing and at times deriving its motion from friction with the moving workpiece.

In both the aforementioned spot welding and seam welding machines the problem arises of conducting the current from one terminal of the transformer secondary to the movable electrode in such a way that the latter can freely move and no detrimental current losses can take place. A well known solution of this problem consists in the use of flexible conductors connecting one terminal of the transformer secondary to the movable electrode. Some of these conductors are made of thin copper laminations and others comprise a cable made of a multitude of thin wires. Both types of conductors have a limited life due to mechanical fatigue and vibrations caused by the electro-dynamic effect of the high amperage alternating current they conduct. The heat generated in them by this current contributes also to their disintegration.

An object of the invention is to provide new and improved structure for conducting current from its source to a movable electrode or similar current carrying conductor and which will be rugged in design and capable of continuous service without appreciable deterioration or wear.

Another object of the invention is to provide sliding contact structure for connecting the movable electrode of a resistance welding machine to one terminal of the secondary power circuit of said machine and which structure will operate efficiently and in a manner to eliminate detrimental current losses while permitting free movement of the electrode.

Another and more specific object of the invention resides in the provision of improved means mounted for pivotal movement for conducting the high amperage currents such as are encountered in resistance welding machines from the transformer secondary to the movable electrode.

Another object of the invention is to provide a sliding contact system employing pivotally mounted current conducting bars for electrically connecting a movable member with a stationary member, and which will have surface contact therewith thereby providing large contact areas which reduce the resistance to the flow of current between the parts.

With these and various other objects in view the invention may consist of certain novel features of construction and operation as will be more fully described and particularly pointed out in the specification, drawing and claims appended hereto.

In the drawings which illustrate an embodiment of the invention and wherein like reference characters are used to designate like parts:

Figure 1 is an elevational view of a resistance welding machine embodying the features of the invention, with parts being shown in section;

Figure 2 is a horizontal view taken substantially along line 2—2 of Figure 1, the pivoting means for the current conducting bars being shown in section to better illustrate the present improvements.

Figure 3:
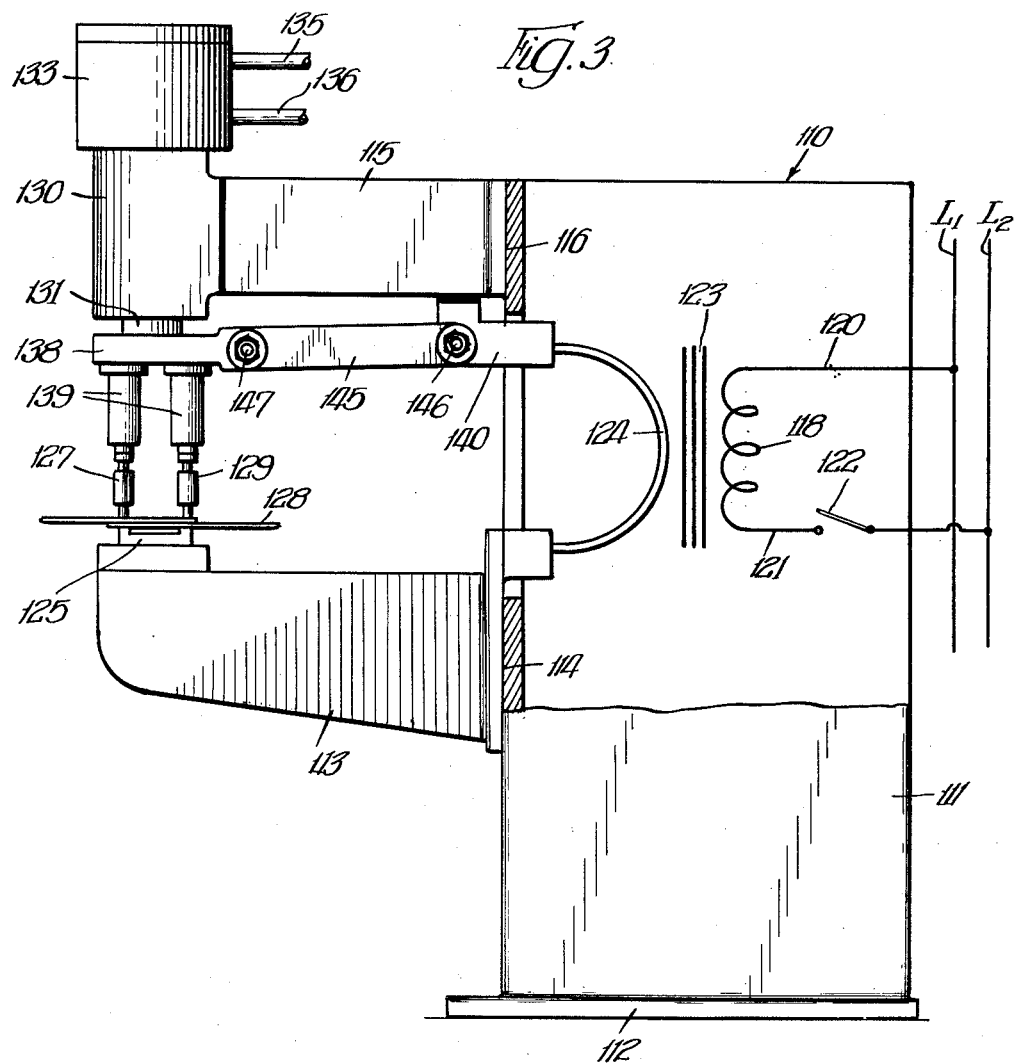
Figure 3 is an elevational view similar to Figure 1 but showing a modification of the invention wherein two movable electrodes are employed.

Referring to the drawings and particularly Figures 1 and 2, the numeral 10 indicates a conventional resistance welding machine to which the improvements of the invention have been applied and which consists of a frame 11, the bottom supporting plate 12, a lower arm 13 suitably fixed to frame 11 as at 14, and an upper arm 15 likewise fixed to the frame as at 16. Resistance welding machines are supplied with electric current from an alternating current source such as indicated by the leads $L_1$ and $L_2$ and to which is electrically connected the primary winding 18 of the machine by conductors 20 and 21. In order that the current supply from the alternating current source to the primary winding may be interrupted by the operator a mechanical switch such as 22 is interposed in one of the conductors such as 21. Of course, electromagnetically operated contactors may be substituted for the switch and the opening and closing of the primary circuit may also be performed in the same efficient manner by using electric discharge valves in combination with control means therefor. The primary winding 18 constitutes one of the elements of the welding transformer and which additionally includes the iron core 23 of high permeability and a secondary winding 24 comprising one or more turns of a copper bar of considerable thickness.

The stationary electrode 25 is suitably positioned by the lower arm 13 which is stationary, being fixed to the frame of the welding machine and to which one terminal of the secondary circuit is secured as at 26. The movable electrode 27 is disposed above electrode 25 and the same is adapted to confine between the parts a workpiece to be welded such as 28. The movable electrode 27 is either integral with or suitably fixed to plunger 30 mounted for sliding movement vertically within head 31 of the resistance welding machine 10. The head 31 is suitably mounted upon and insulated from arm 15, the insulating strip between the head and arm being indicated by numeral 32. The upper end of plunger 30 extends into pressure chamber 33 and said end is fixed to piston 34 adapted to have reciprocating movement within the chamber. The flow pipe 35 communicates with chamber 33 adjacent the upper end of the chamber and accordingly the same is located above piston 34. The flow pipe 36 connects with the head adjacent the bottom of the pressure chamber and the same is thus located below piston 34. When the pressure fluid is admitted above the piston by pipe 35 and exhausted from below the same by pipe 36 the piston 34 is caused to move in a downward direction, imparting similar movement to the plunger 30 and the electrode 27. A reverse of the above operations will effect upward movement of the piston and thus of the movable electrode 27.

High amperage current from secondary circuit 24 is conducted to the movable electrode 27 by the sliding contact system of the invention which is shown in detail in Figure 2. A member 38 of good conductive material similar to that of electrode 27 is suitably fixed to the electrode to form a unitary structure therewith. Member 38 accordingly moves in a vertical direction with the electrode and provides the conductor through which the high amperage currents are supplied to the electrode. A stationary member 40 also composed of material of high conductivity is suitably fixed to arm 15, there being interposed between the parts an insulator 41 in order to insulate conductor 40 from said arm in the same manner as head 31 is insulated therefrom. The member 40 is suitably connected to the other end of the secondary circuit 24 as at 42.

The pivoted conductors 44 and 45 electrically connect the stationary member 40 with the movable electrode 27. Said conductors comprise bars of copper or other metal of high conductivity having pivotal securement at their ends to the members respectively, each pivot mounting including a pin indicated by numeral 46 for the stationary member 40 and 47 for the movable member 38. Said pin 47 is insulated by the tube 48 of insulating material and which extends through the member 38 and into the bars 44 and 45 so that the pivot pin is insulated from the member and also from the bars. Washers 49 of insulating material are located on each end of the pivot pin 47 and coil springs 50 are retained on the pivot pin, being confined between the washers and their respective retaining nut 51. The bars have surface contact with the member 38 and due to their pivotal mounting the bars move with respect to the member so that a sliding contact results. The relatively large area in contact materially reduces the resistance to the flow of electric current from the bars to the member and current flow is further facilitated by the pressure contact existing between the relatively moving parts.

The pivot pin 46 is likewise insulated by a tube 52 which extends through the bore 53 in the stationary member 40 and into openings in each bar. It will be noted that bore 53 is horizontally elongated. This is necessary in order that the electrode 27 may move vertically, the horizontal component of the motion moving the pivot pin 46 within the elongated bore. The washers 54 of insulating material are located on each end of the pivot pin and coil springs 55 are retained on the pivot pin, being confined between the washers and their respective retaining nut 56. The bars 44 and 45 at this end have surface contact with the stationary member 40 and the coacting surfaces are held in pressure contact by the coil springs 55. Cooling water is caused to flow through the conductive bars 44 and 45 by means of tubes 57, the cooling water carrying off the heat developed as a result of the high amperage currents conducted by the bars and which thus maintains the contact faces between the bars and the members at a relatively low temperature.

The modification shown in Figure 3 has application to a resistance welding machine of the type employing two movable electrodes. These electrodes are of the type generally referred to as "spring loaded." The machine designated generally by numeral 110 consists of a frame 111, a bottom plate 112, the lower arm 113 fixed to the frame at 114, and an upper arm 115 likewise fixed to the frame at 116. The alternating current source designated by the leads $L_1$ and $L_2$ is connected to the primary winding 118 by conductors 120 and 121, the latter having a switch 122 or equivalent electromagnetic or electronic means for opening and closing the primary circuit. The welding transformer is completed by the iron core 123 and the secondary winding 124.

One terminal of the secondary winding is electrically connected to the lower arm 113 which carries the stationary lower electrode 125. The movable electrodes 127 and 129 are disposed above the stationary electrodes and between the parts a workpiece such as 128 is held. The head 130 is suitably fixed upon and insulated from arm 115 and said head is provided with the usual hydraulic means including the pressure chamber 133 within which is adapted to reciprocate a piston not shown. The flow pipes 135 and 136 supply the pressure chamber with a fluid to effect reciprocating movement of the piston. The plunger 131 depends from the lower end of the head 130 and it will be understood that the plunger is fixed to said piston within chamber 133 so that the plunger moves in a vertical direction and imparts similar movement to the conductive member 138 suitably fixed thereto. Housings 139 are in turn fixed to the conductive member 138 and said housings in turn mount the electrodes 127 and 129 in a manner as clearly shown and described in my copending application Serial No. 109,052, filed July 26, 1949, and entitled Sliding Contact System for Conducting Electric Currents.

As described with respect to Figure 1 the conducting bars of the invention are employed for conducting the high amperage current from the stationary member 140 to the movable member 138. The bars are pivotally secured to member 140 by pivot pin 146 which operates within a horizontally elongated opening in member 140 in order that the same may have bodily movement such as will permit vertical movement of member 138. The pivot pin 147 joins the conducting bars to said movable member and with respect to this joint the bars have pivoting movement only, whereas, with respect to pivot pin 146 the bars have pivotal movement as well as sliding movement relative thereto. The structure provides large contact areas and which are maintained in pressure engagement by means of the coil springs so that the welding current is conducted to the electrodes in an efficient manner and which is such as to eliminate detrimental current losses so that the structure has a long life notwithstanding the heavy duty requirements made upon it.

It is to be understood that many other uses and applications of the invention will be apparent to those skilled in the art and it is not desired that this invention be limited to the details described for its scope includes all such forms or improvements as come within the spirit of the following claims construed as broadly as the prior art will permit.

What is claimed is:

1. In an electrical system for conducting high amperage currents, in combination, a stationary member, a vertically movable electrode member in horizontal spaced relation with respect to the stationary member, means electrically connecting the members comprising a pair of conductive bars disposed on the respective sides of the members and having surface contact therewith, each said member providing end portions having flat side areas to facilitate the surface contact of the bars, means pivotally joining the bars to each member at the area of surface contact including a pivot pin of metal supported by each member and insulated therefrom by being encased in a tube of insulating material, each pivot pin extending outwardly beyond the respective bars, and resilient means retained by each end of a pivot pin for yieldingly holding its respective bar in surface contact with the member.

2. In an electrical system for conducting high amperage currents, in combination, a stationary member, a vertically movable electrode member in horizontal spaced relation with respect to the stationary member, means electrically connecting the members comprising a pair of conductive bars disposed on respective sides of the members and having surface contact therewith, each said member providing end portions having flat side areas to facilitate the surface contact of the bars, means pivotally joining the bars to each member at the area of surface contact including an insulated pivot pin extending through each member and into the bars on the respective sides thereof, each pivot pin extending outwardly beyond the respective bars, and resilient means retained by each end of a pivot pin for yieldingly holding its respective bar in surface contact with the member one of said members having an opening elongated in a substantially horizontal direction for mounting its pin whereby to provide for sliding movement of the pin and the bars supported thereby with respect to the member.

DAVID SCIAKY.

REFERENCES CITED

The following references are of record in the file of this patent:

UNITED STATES PATENTS

| Number | Name | Date |
|---|---|---|
| 1,752,236 | Conklin | Mar. 25, 1930 |
| 2,140,907 | Froland | Dec. 20, 1938 |
| 2,259,800 | Cox | Oct. 21, 1941 |
| 2,274,422 | Mahoney | Feb. 24, 1943 |
| 2,322,796 | Fentress | June 29, 1943 |
| 2,347,030 | Crabbs | Apr. 18, 1944 |
| 2,542,669 | Harrison | Feb. 20, 1951 |